(12) United States Patent
Miki et al.

(10) Patent No.: US 7,760,078 B2
(45) Date of Patent: Jul. 20, 2010

(54) WIRELESS BICYCLE COMMUNICATION DEVICE

(75) Inventors: Yoshimitsu Miki, Osaka (JP); Kazunori Ookubo, Osaka (JP)

(73) Assignee: Shimano Inc., Osaka (JP)

( * ) Notice: Subject to any disclaimer, the term of this patent is extended or adjusted under 35 U.S.C. 154(b) by 277 days.

(21) Appl. No.: 12/143,591

(22) Filed: Jun. 20, 2008

(65) Prior Publication Data

US 2009/0315692 A1 Dec. 24, 2009

(51) Int. Cl.
 *B62J 3/00* (2006.01)
(52) U.S. Cl. ..................................... 340/432
(58) Field of Classification Search ................. 340/432, 340/539.1, 691.6, 815.4; 74/502.2
See application file for complete search history.

(56) References Cited

U.S. PATENT DOCUMENTS

| | | | |
|---|---|---|---|
| 5,008,647 A * | 4/1991 | Brunt et al. ................. | 340/432 |
| 6,698,567 B2 | 3/2004 | Dal Pra' | |
| 6,991,081 B2 | 1/2006 | Uno et al. | |
| 7,132,931 B2 * | 11/2006 | Okada ........................ | 340/427 |
| 7,292,923 B2 | 11/2007 | Guderzo | |
| 7,651,423 B2 * | 1/2010 | Ichida et al. ................. | 474/80 |
| 2003/0001730 A1 | 1/2003 | Piper et al. | |
| 2006/0292998 A1 * | 12/2006 | Chan et al. .................. | 455/101 |
| 2007/0137361 A1 | 6/2007 | Fujii | |
| 2007/0179632 A1 | 8/2007 | Campagnolo et al. | |
| 2007/0193387 A1 | 8/2007 | Nakano | |
| 2007/0193388 A1 | 8/2007 | Nakano | |
| 2008/0088423 A1 * | 4/2008 | Liu ............................. | 340/432 |

FOREIGN PATENT DOCUMENTS

| | | |
|---|---|---|
| FR | 2 851 222 A1 | 8/2004 |
| JP | 2008-074402 A | 4/2008 |

OTHER PUBLICATIONS

Photographs of MAVIC MEKTRONIC shifter system.

* cited by examiner

*Primary Examiner*—Phung Nguyen
(74) *Attorney, Agent, or Firm*—Global IP Counselors, LLP

(57) ABSTRACT

A wireless bicycle communication device includes a bracket, an electronic switch, an antenna, a wiring assembly and a radio communication unit. The electronic switch is coupled to the bracket and configured to generate switching signals. The antenna is supported to an antenna receiving portion of the bracket. The wiring assembly electrically connects the antenna and a first connector. The radio communication unit is disposed within a radio unit receiving portion of the bracket and has a second connector configured to detachably mate with the first connector. The radio communication unit is configured to process switching signals from the electronic switch and broadcast corresponding radio signals via the antenna.

19 Claims, 16 Drawing Sheets

WIRELESS BICYCLE COMMUNICATION DEVICE

BACKGROUND OF THE INVENTION

1. Field of the Invention

This invention generally relates to a wireless bicycle communication device. More specifically, the present invention relates to a wireless bicycle communication device that transmits switching signals.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Some components that have been extensively redesigned are the bicycle derailleur systems, the shifter mechanism, the brake lever and a display unit that provides the rider with a variety of different types of information.

The display unit includes a central processing unit and memory that can display useful information to benefit the cyclist. For example, the display unit can display time, cycling trip time, trip distance, odometer readings, a stop watch display, cadence (RPMs), speed, average speed, lap counter and heart rate (with the cyclist wearing a heart rate sensor).

In order to switch between data being displayed, it is necessary for the cyclist to press a button on the display unit or a button on a separate switching device remote from the display unit. Consequently, the cyclist must move his or her hand away from a grip portion of the handlebar. During a race, moving the hands from the grip portion of the handlebar is not desirable.

Further, each component installed on the exterior of a bicycle frame has the potential to create wind resistance or drag. For many cyclists, there is a constant drive to reduce such wind resistance. Simple components, such as wires and cables can contribute to drag when cycling at high speeds. It is therefore desirable to reduce the exposure of such wires and cables or eliminate them altogether. One example of such elimination of wind resistance creating components has been the development of electrically powered bicycle front and rear derailleurs. The traditional Bowden cables that control positioning of the front and rear derailleurs have been eliminated and replace with transmission wires that are easily inserted into hollow portions of the bicycle frame. However, wires extending from a shifter mounted to a handlebar of the bicycle frame are still exposed, thus contributing to wind resistance.

Display units having a remote switch also typically include a wire extending between the remote switch and the display unit, thus creating additional drag.

Recently, mode switches for effecting operation mode changes in such display units have been added to brake lever assemblies and/or derailleur shifting mechanisms. However, a wire must also extend between such devices and the display unit.

In view of the above, it will be apparent to those skilled in the art from this disclosure that there exists a need for an improved remote switch that eliminates the need for wires extending along the handlebar of the bicycle frame. This invention addresses this need in the art as well as other needs, which will become apparent to those skilled in the art from this disclosure.

SUMMARY OF THE INVENTION

One object of the present invention is to reduce bicycle wind resistance.

Another object of the present invention is to eliminate exposed wires extending from a display unit.

Another object of the present invention is to provide a wireless communication device concealed within another bicycle device, such as a shifter or a brake lever.

The foregoing objects can basically be attained by providing a wireless bicycle communication device that includes a bracket, an electronic switch, an antenna, a wiring assembly and a radio communication unit. The bracket has a bicycle frame attachment portion, a radio unit receiving portion located at an upper portion of the bracket spaced apart from the bicycle frame attachment portion and an antenna receiving portion disposed at an inboard side of the bracket between the bicycle frame attachment portion and the radio unit receiving portion. The electronic switch is coupled to the bracket and configured to generate switching signals. The antenna is supported to the antenna receiving portion. The wiring assembly includes a first connector disposed within the radio unit receiving portion of the bracket and electrically connects the antenna and the first connector. The radio communication unit is disposed within the radio unit receiving portion and has a second connector configured to detachably mate with the first connector. The radio communication unit is configured to process switching signals from the electronic switch and broadcast corresponding radio signals via the antenna.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
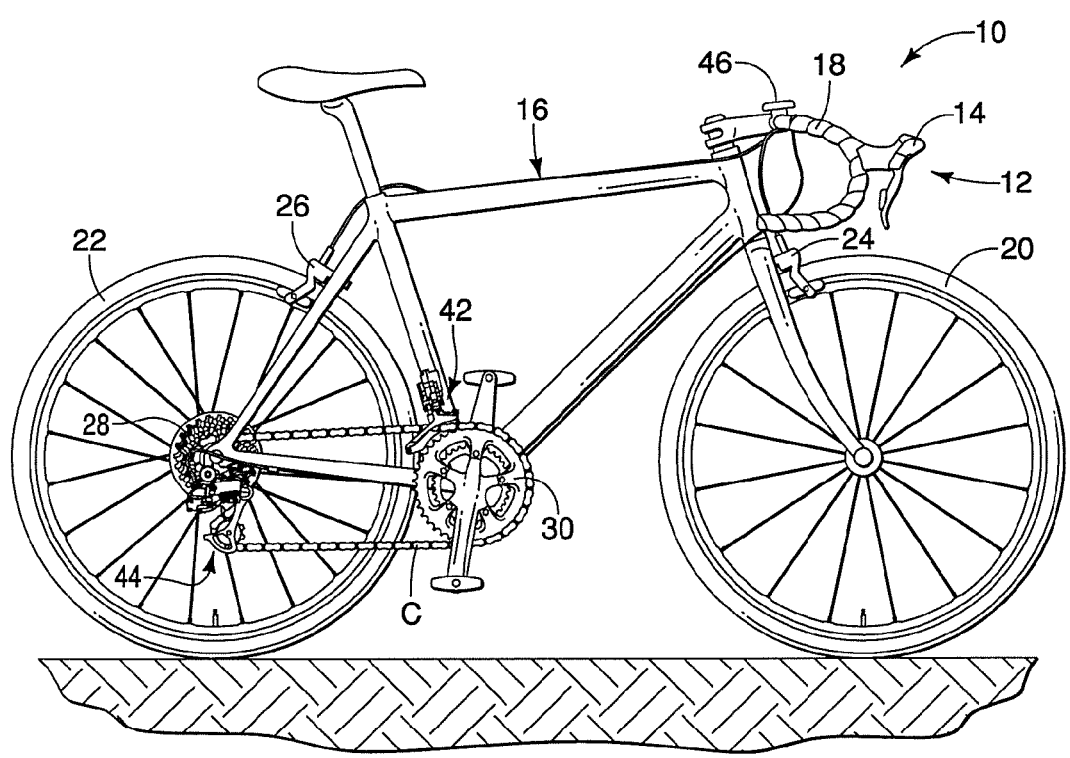
FIG. 1 is a side elevational view of a bicycle that includes a wireless bicycle communication device mounted to the handlebar of the bicycle in accordance with a first embodiment of the present invention.

Referring initially to FIG. 1, a bicycle 10 is illustrated in accordance with a first embodiment of the present invention.

The bicycle 10 has an electrically powered wireless switching system 12 that includes at least one wireless communication device 14 with an electronic switch 15, as described in greater detail below.

Figure 2:
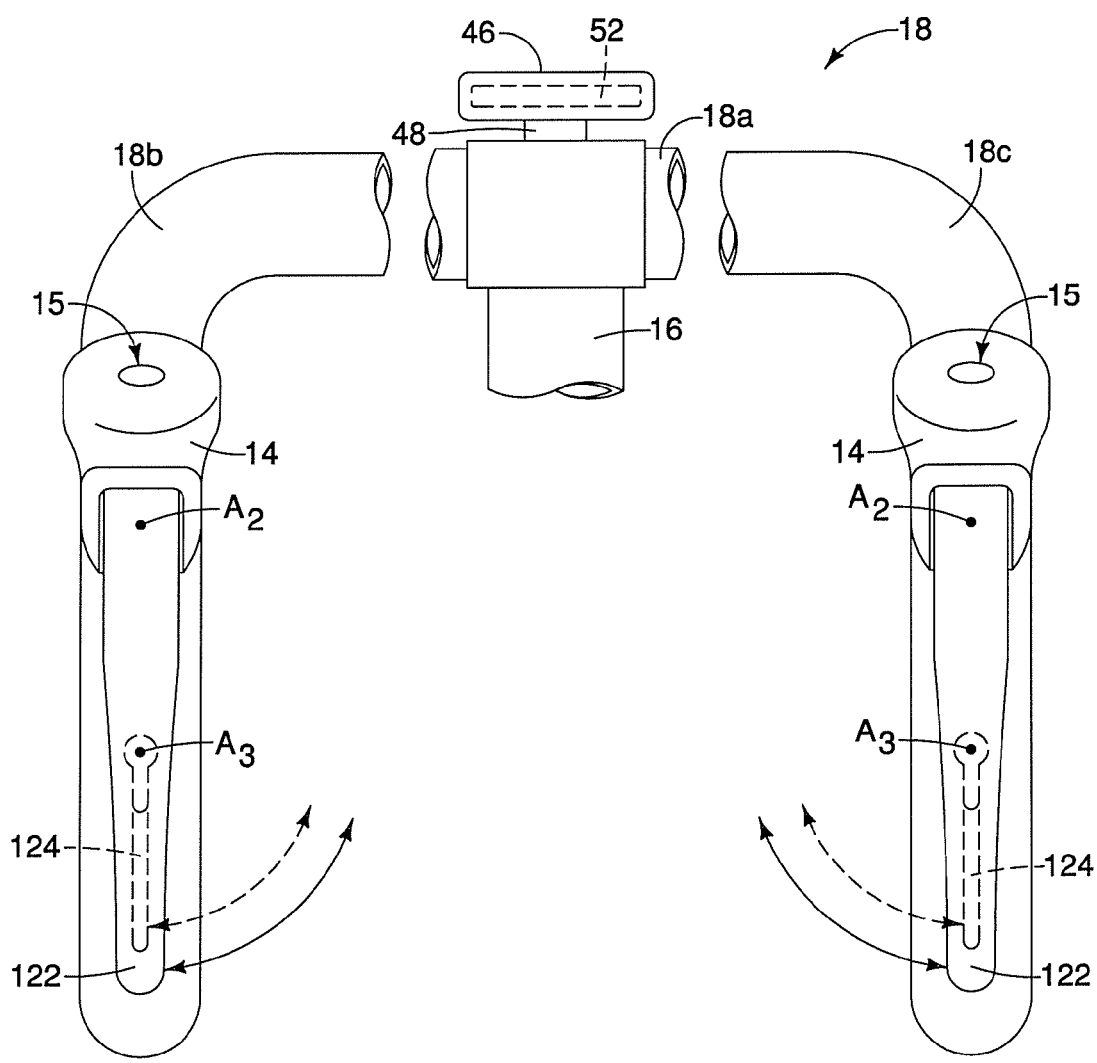
FIG. 2 is a front view of a portion of the bicycle showing a controller/display unit and a pair of the wireless bicycle communication devices mounted to portions of the handlebar in accordance with the first embodiment of the present invention.
Figure 3:
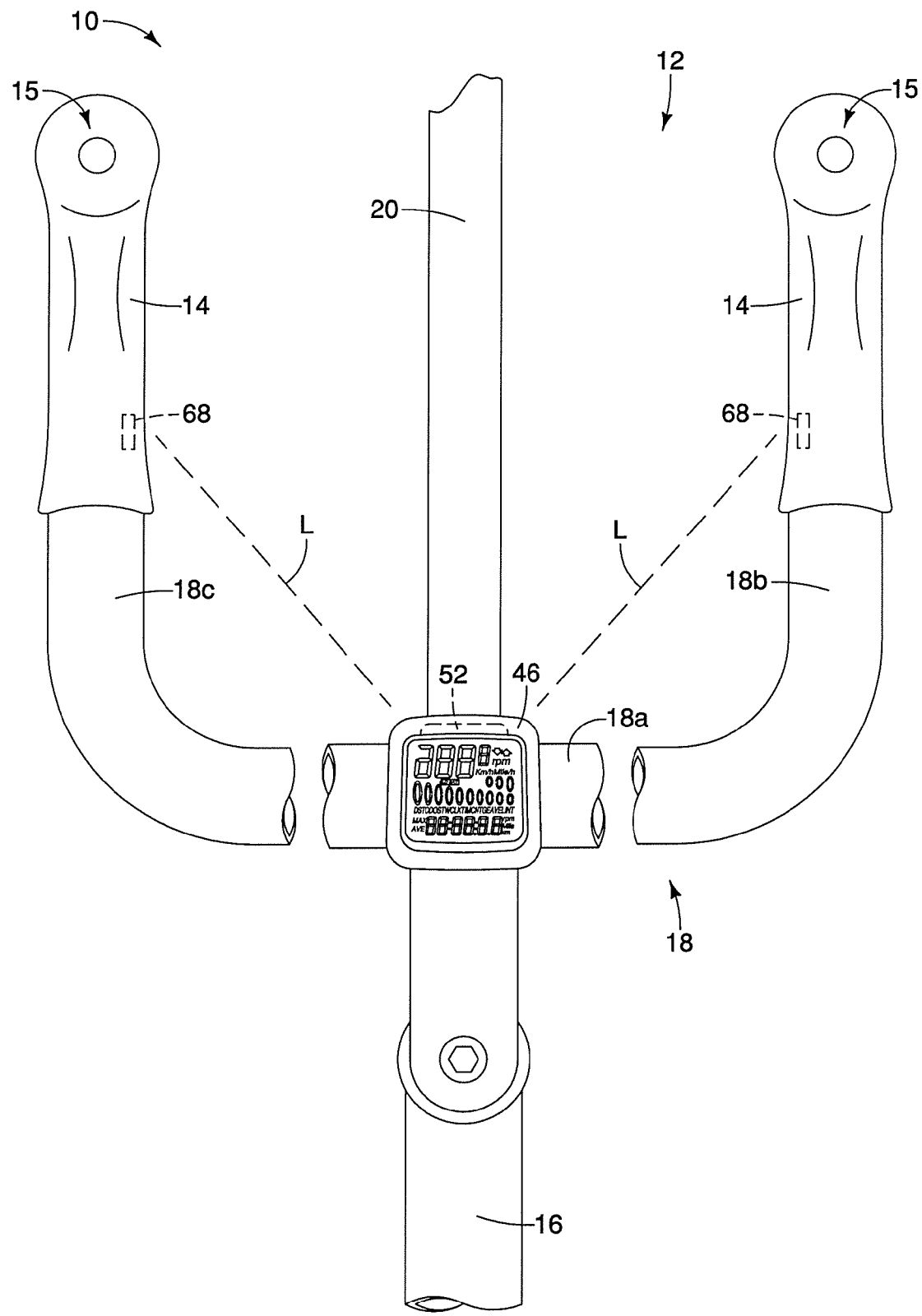
FIG. 3 is a top view of the portion of the bicycle showing the controller/display unit and the pair of the wireless bicycle communication devices mounted to the portions of the handlebar in accordance with the first embodiment of the present invention.

The bicycle 10 includes a bicycle frame 16 with a handlebar 18, a front wheel 20, a rear wheel 22, front brakes 24, rear brakes 26 and the electrically powered switching system 12. As shown in FIGS. 2 and 3, the handlebar 18 includes a central portion 18a, a right portion 18b and a left portion 18c. Referring again to FIG. 1, the front wheel 20 is mounted in a conventional manner to a steering fork of the bicycle frame 16 below the handlebar 18. The back wheel 22 includes a cassette 28 of chain sprockets and is mounted in a conventional manner to a rear portion of the bicycle frame 16. A chainring assembly 30 is rotatably supported to a lower portion of the bicycle frame 16 in a conventional manner.

The front brakes 24 are mounted to the steering fork of the bicycle frame 16 adjacent to the front wheel 20 in a conventional manner. The rear brakes 26 are mounted to the rear portion of the bicycle frame 16 adjacent to the rear wheel 20 in a conventional manner. Since the front wheel 20, the rear wheel 22, the front brakes 24, the rear brakes 26, the cassette 28 and the chainring assembly 30 are all conventional elements, no further description is provided for the sake of brevity. The bicycle 10 also a front derailleur 42 and a rear derailleur 44 that are described in greater detail below. The electrically powered switching system 12 includes a controller/display unit 46 (a central processing unit) and at least one wireless communication device 14.

The front derailleur 42 is attached to the bicycle frame 16 in a conventional manner adjacent to the chainring assembly 30. The front derailleur 42 is configured to move the chain C between the chainrings of the chainring assembly 30 in a conventional manner.

The rear derailleur 44 is attached to the bicycle frame 16 in a conventional manner adjacent to the cassette 28 and the rear wheel 22. The rear derailleur 44 is configured to move the chain C between the various diameter sprockets of the cassette 28 in a conventional manner.

A description of the electrically powered switching system 12 is now provided with initial reference to FIG. 1. The controller/display unit 46 is a basically a computer control module that is attached to the central portion 18a of the handlebar 18 via a bicycle attachment portion 48. The controller/display unit 46 includes a central processing unit (CPU) (not shown), conventional electronic memory, such as RAM, ROM and/or FLASH memory, an optional connector cable 50 (FIGS. 1 and 2 only), a display, a radio signal receiver 52 (FIGS. 2 and 3 only) and a battery (not shown) that powers the controller/display unit 46.

The controller/display unit 46 is configured (programmed) to provide various information to a cyclist and optionally perform various functions for the cyclist. For example, the controller/display unit 46 can be cycled or toggled to display any of the following modes of operation: display time, cycling trip time, trip distance, odometer readings, a stop watch display and operation, cadence (RPMs), speed, average speed and lap counter. Optional features of the controller/display unit 46 include: displaying current derailleur positions (with conventional connections to one or both of the front derailleur 42 and the rear derailleur 44); displaying and/or controlling optional suspension features (not shown) added to the bicycle 10; and displaying cyclist heart rate data based on remote sensors (not shown) worn by a cyclist.

Figure 4:
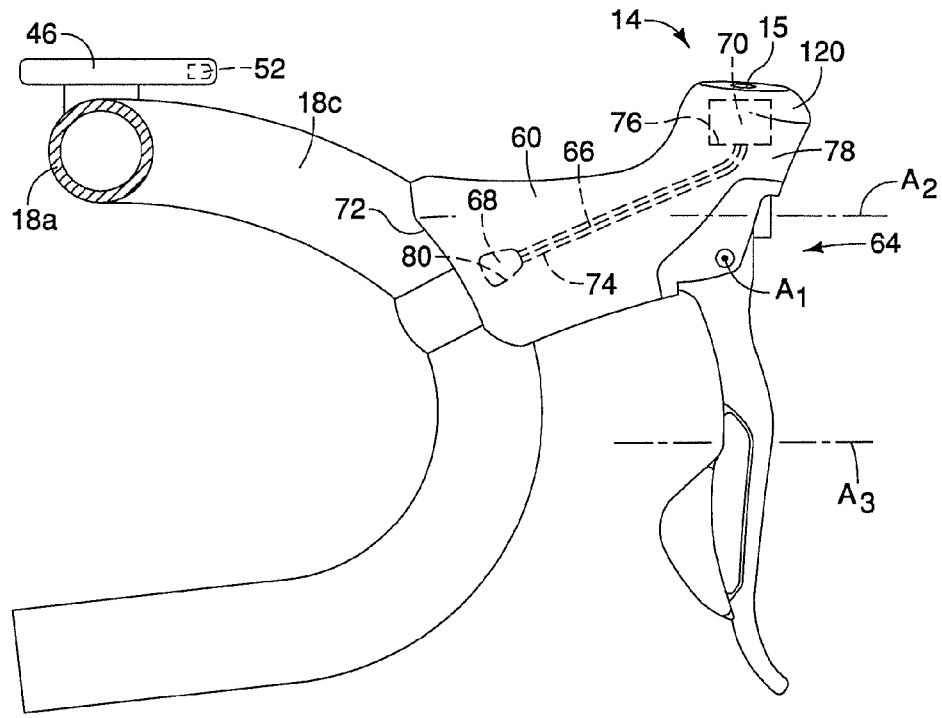
FIG. 4 is a side view of a portion of the handlebar showing an inboard side of one of the two wireless bicycle communication devices in accordance with the first embodiment of the present invention.
Figure 5:
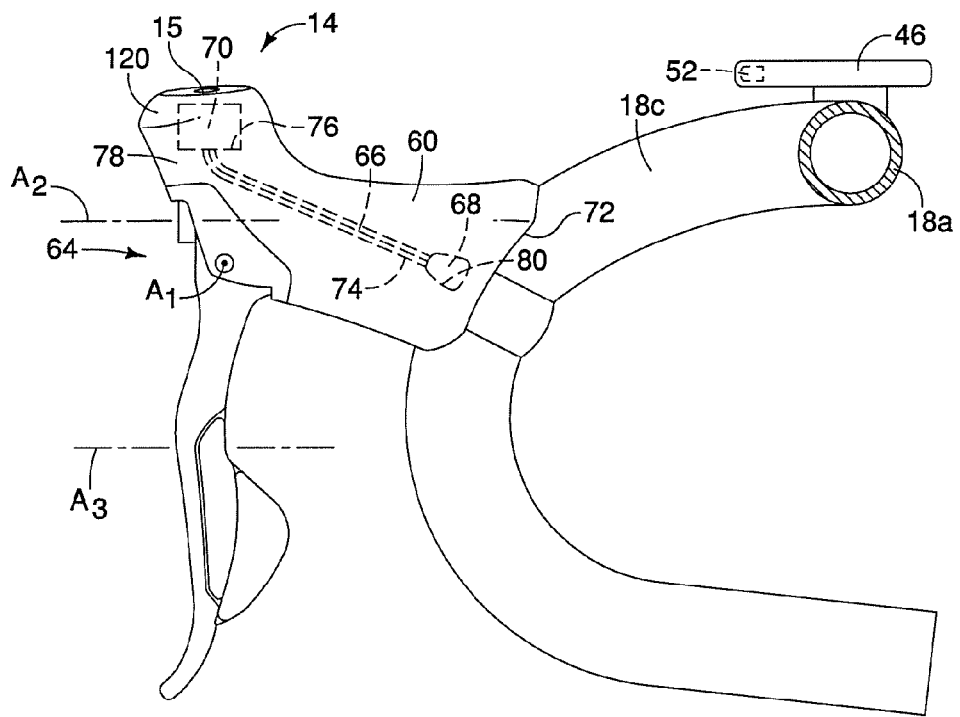
FIG. 5 is another side view of a portion of the handlebar showing an inboard side of the other of the two wireless bicycle communication devices in accordance with the first embodiment of the present invention.

A description of the wireless communication device 14 is now provided with initial reference to FIGS. 2-6. In the depicted embodiment, the wireless communication device 14 is a brake control lever that can optionally include a conventional mechanical shifter mechanism. Also, there are two of the wireless communication devices 14 depicted in the electrically powered switching system 12, one operating the front brakes 24 and one for operating the rear brakes 26. However, it should be understood from the drawings and the following description that a single one of the wireless communication device 14 can be employed. The wireless communication device 14 is configured to transmit signals to the controller/display unit 46, which then toggles between its various modes of operation as described above. In the depicted embodiment, the electrically powered switching system 12 includes two of the wireless communication devices 14, however, only one of the wireless communication devices 14 is required for the practice of the present invention. If two of the wireless communication devices 14 are included, one of the wireless communication devices 14 is fixed to the right portion 18b of the handlebar 18, as shown in FIGS. 2, 3 and 5, and the other of the wireless communication device 14 is fixed to the left portion 18c of the handlebar 18, as shown in FIGS. 2, 3 and 4.

Figure 6:
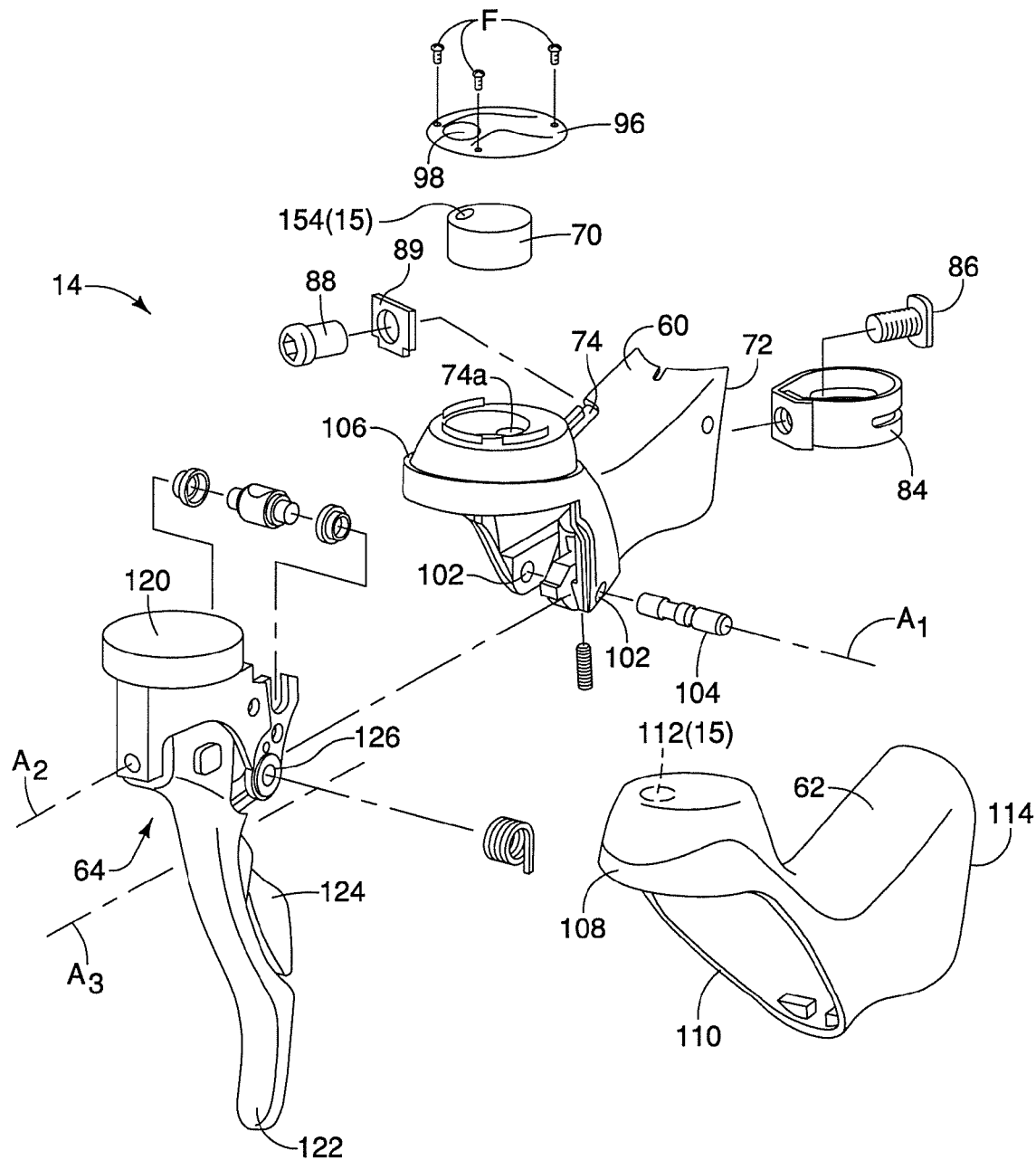
FIG. 6 is an exploded view of one of the wireless bicycle communication devices shown removed from the bicycle, showing a bracket, a cover portion and a brake lever assembly in accordance with the first embodiment of the present invention.

As shown in FIGS. 4, 5 and 6, the wireless communication device 14 includes a bracket 60, a cover portion 62, a brake lever assembly 64, a wiring assembly 66, an antenna 68 and a removable radio communication unit 70.

In the depicted embodiment, the wireless communication device 14 is configured to transmit switching signals to the controller/display unit 46 in order to toggle or change the mode of operation of the controller/display unit 46. Preferably, at least one of the two wireless communication devices 14 includes a mechanical shifting mechanism. The mechanical shifting mechanism on one of the two wireless communication devices 14 is configured to control positioning of the front derailleur 42 and the mechanical shifting mechanism on the other wireless communication device 14 is configured to control positioning of the rear derailleur 44. Since the wireless communication device 14 are basically identical (except that they are symmetrical to one another, one for the right side of the bicycle 10 and one for the left side of the bicycle 10) description of only one of the wireless communication device 14 is provided below. However the description of one of the wireless communication device 14 applies to both.

It should be understood from the description herein that the two wireless communication devices 14 are interchangeable in that either one or both can be configured to transmit signals to the controller/display unit 46.

It should also be understood from the description and drawings herein that the controller/display unit 46 can be programmed to distinguish between the two wireless communication device 14 either by setting each of the wireless communication device 14 to send signals at different radio frequencies or provide each of the wireless communication device 14 with separate electronic signatures in order to distinguish the two from one another.

The bracket 60 of the wireless communication device 14 is preferably made of a light weight material such as composite materials, plastic, polymers or light weight metals such as aluminum or titanium. The bracket 60 includes a bicycle frame attachment portion 72, a channel 74, a radio unit receiving portion 76, a brake lever support portion 78 and an antenna receiving portion 80 that is spaced apart from the radio unit receiving portion 76.

The bicycle frame attachment portion 72 includes a mounting clamp or strap 84, tightening fasteners 86 and 88 and a washer 89, shown in FIG. 6. The strap 84 and tightening fasteners 86 and 88 attach to the bicycle frame attachment portion 72 in a conventional manner via a recess/aperture 90, and the washer 89 inserts into a recess 91, indicated in FIG. 8.

The strap 84 is dimensioned to clamp about either of the right portion 18b and the left portion 18c of the handlebar 18 in a conventional manner.

Figure 8:
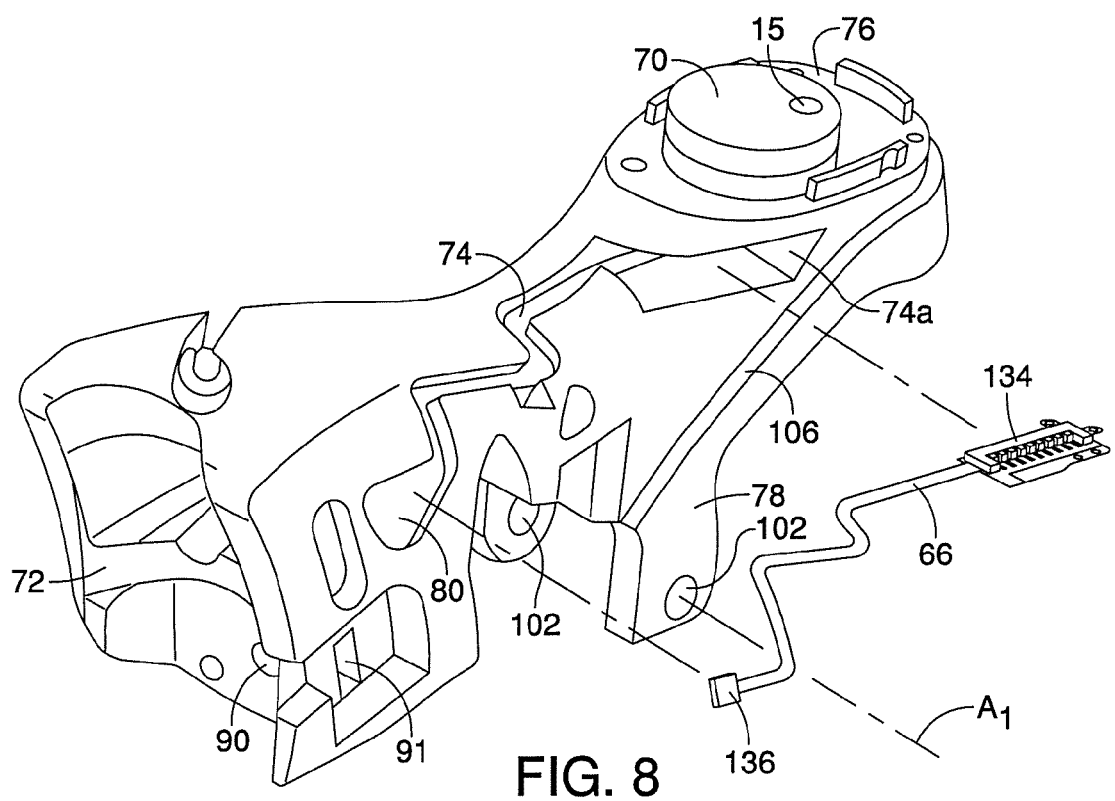
FIG. 8 is a perspective exploded view of the bracket of the wireless bicycle communication device and a corresponding wiring assembly with other portions of the wireless bicycle communication device removed to reveal a channel that receives a portion of the wiring assembly, a brake lever support portion, a radio unit receiving portion and an antenna receiving portion in accordance with the first embodiment of the present invention.

The channel 74 is a recess formed on the outer surface of the bracket 60 that extends between the radio unit receiving portion 76 and the antenna receiving portion 80 as best shown in FIG. 8. Adjacent to the radio unit receiving portion 76, the channel 74 includes an enlarged recess portion 74a that is best shown in FIGS. 8, 12, 13 and 15. The enlarged recess portion 74a is dimensioned to receive a rubber cover 92 that is described in greater detail below.

Figure 9:
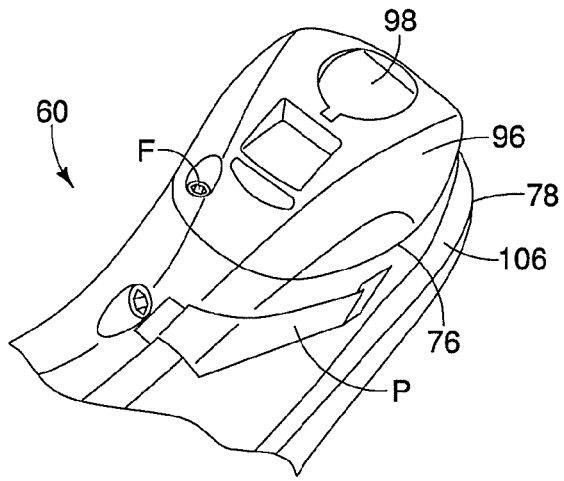
FIG. 9 is a perspective view of the radio unit receiving portion of the bracket of the wireless bicycle communication device showing a cover in accordance with the first embodiment of the present invention.
Figure 10:
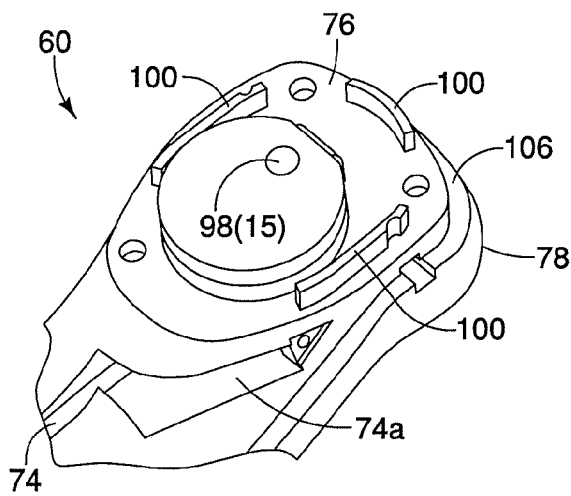
FIG. 10 is another perspective view of the radio unit receiving portion of the bracket of the wireless bicycle communication device similar to FIG. 9, showing the cover removed to reveal a removable radio communication unit in accordance with the first embodiment of the present invention.
Figure 11:
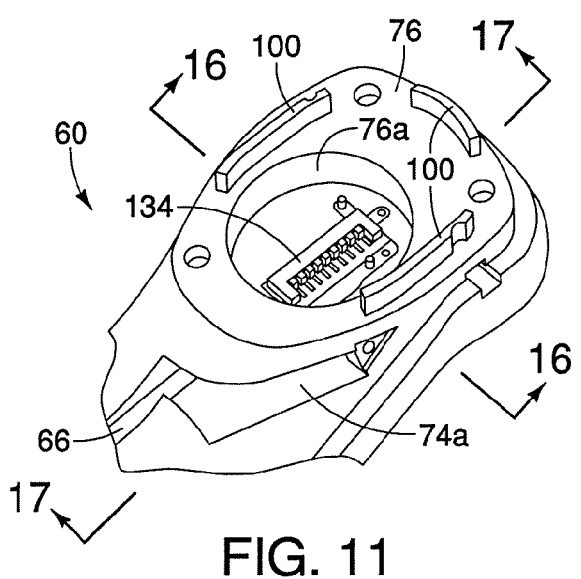
FIG. 11 is another perspective view of the radio unit receiving portion of the bracket of the wireless bicycle communication device similar to FIGS. 9 and 10, showing the cover and the removable radio communication unit removed to reveal a connector of the wiring assembly and alignment posts of the radio unit receiving portion of the bracket in accordance with the first embodiment of the present invention.
Figure 12:
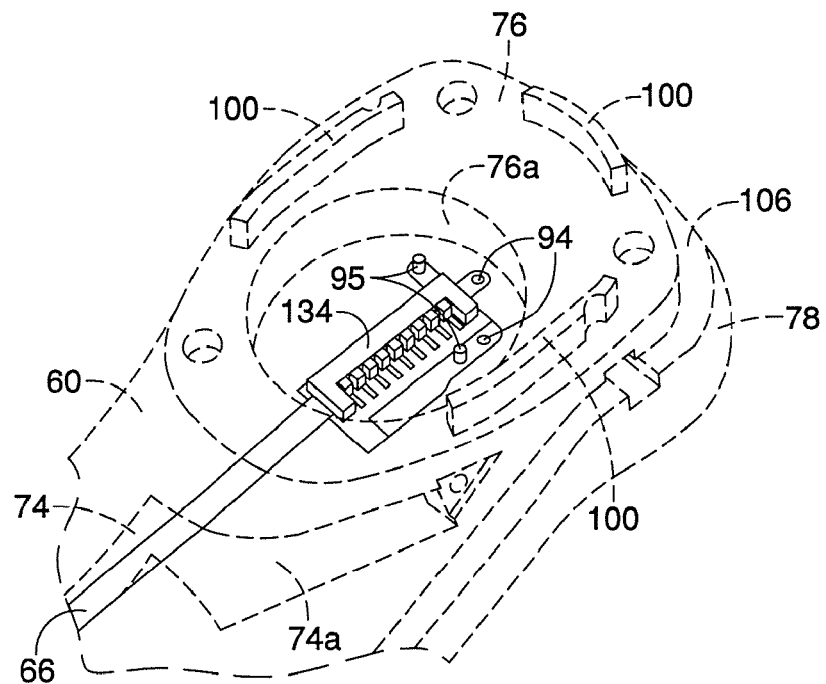
FIG. 12 is another perspective view of the radio unit receiving portion of the bracket of the wireless bicycle communication device similar to FIGS. 9-11, with the bracket shown in phantom to reveal details of the connector of the wiring assembly installed in the radio unit receiving portion of the bracket in accordance with the first embodiment of the present invention.
Figure 13:
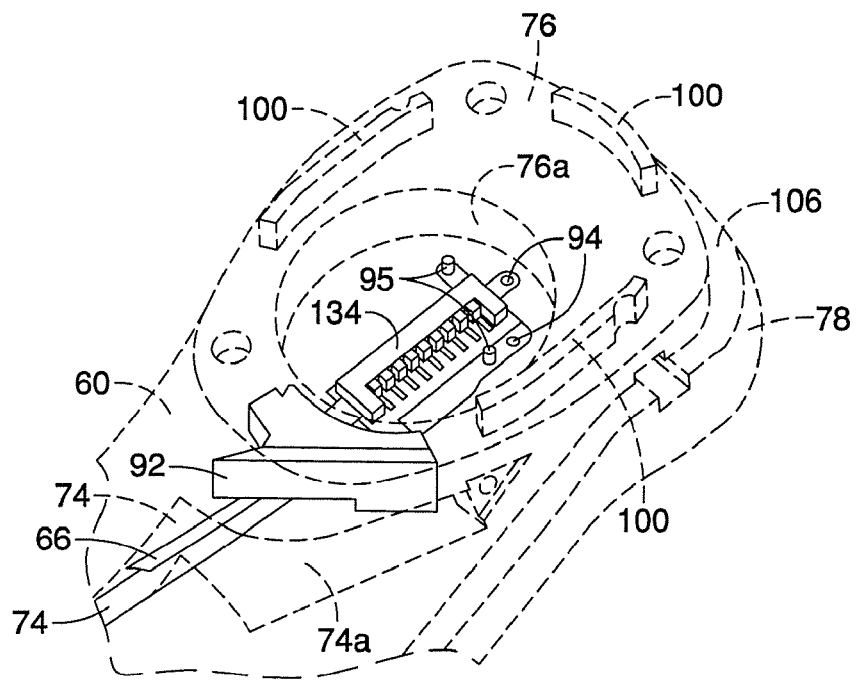
FIG. 13 is another perspective view of the radio unit receiving portion of the bracket of the wireless bicycle communication device similar to FIGS. 9-12, with the bracket shown in phantom to reveal details of a rubber cover installed in a portion of the channel of the bracket adjacent to the connector of the wiring assembly in accordance with the first embodiment of the present invention.
Figure 14:
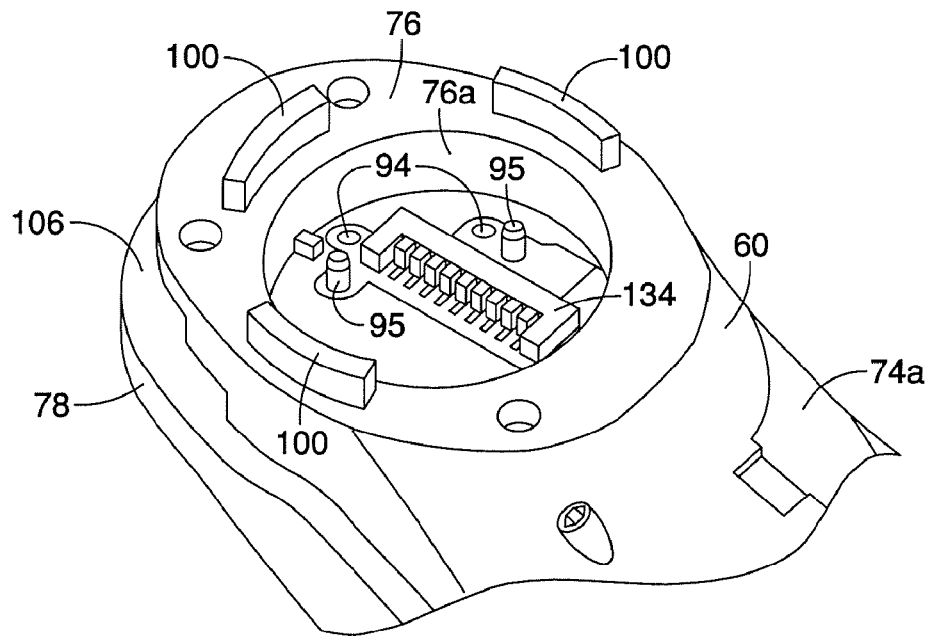
FIG. 14 is a different perspective view of the radio unit receiving portion of the bracket of the wireless bicycle communication device, with the cover and the removable radio communication unit removed to reveal further details of the connector of the wiring assembly and the alignment posts of the radio unit receiving portion of the bracket in accordance with the first embodiment of the present invention.
Figure 15:
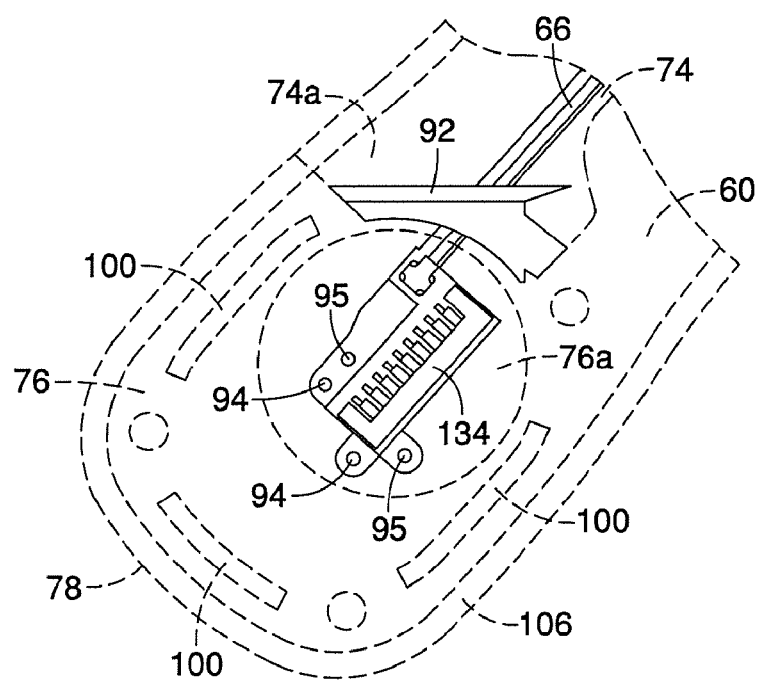
FIG. 15 is a top plan view of the radio unit receiving portion of the bracket of the wireless bicycle communication device, with the bracket shown in phantom, showing details of the connector of the wiring assembly, the alignment posts of the radio unit receiving portion of the bracket and the rubber cover in accordance with the first embodiment of the present invention.
Figure 17:
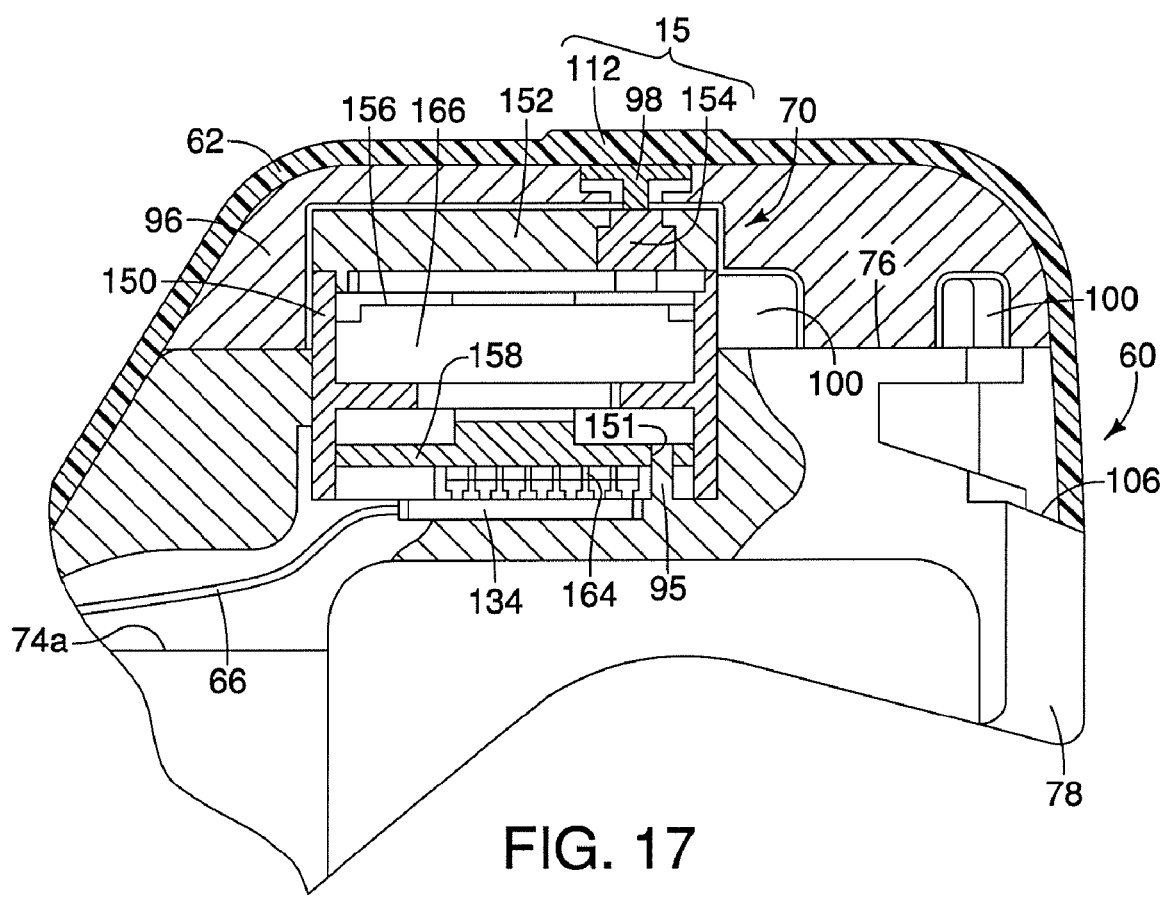
FIG. 17 is a side cross-sectional view of the radio unit receiving portion of the bracket of the wireless bicycle communication device, taken along the lines 17-17 in FIG. 11, showing details of the removable radio communication unit in accordance with the first embodiment of the present invention.

The radio unit receiving portion 76 includes a blind bore 76a that can alternatively be a trough or concaved portion, and is dimensioned to receive and at least partially conceal the removable radio communication unit 70, as best shown in FIGS. 11-15. As shown in FIG. 17, the blind bore 76a of the radio unit receiving portion 76 is open to the channel 74. As best shown in FIGS. 13, 14 and 15, the radio unit receiving portion 76 is round with alignment posts 94 and 95 extending upward from a bottom surface of the radio unit receiving portion 76. As best shown in FIG. 13, the alignment posts 95 are taller than the posts 94, as explained further below. As best shown in FIGS. 6 and 9, the radio unit receiving portion 76 also includes a removable cover 96.

The removable cover 96 is removably attached to the bracket 60 via fasteners F. The removable cover 96 includes a mode switching button 98 that partially defines the electronic switch 15, as described greater detail below. Alignment ridges 100 in the top of the bracket 60 assist in proper installation of the removable cover 96 on the bracket 60.

Figure 7:
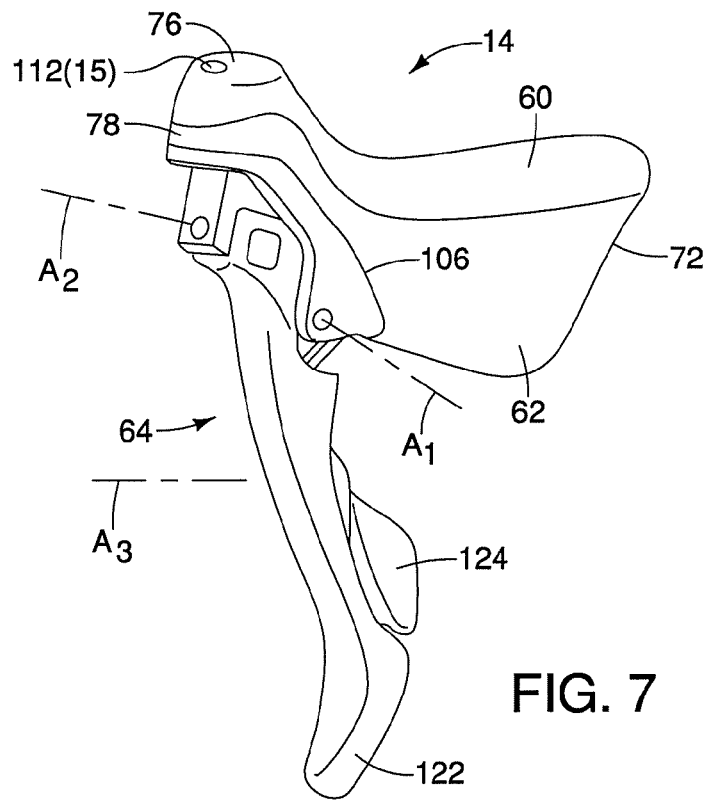
FIG. 7 is a perspective view of a fully assembled wireless bicycle communication device shown removed from the bicycle in accordance with the first embodiment of the present invention.

As best shown in FIGS. 6 and 7, the brake lever support portion 78 is a conventional portion of the bracket 60 in that it supports the brake lever assembly 64. As shown in FIG. 6, the brake lever support portion 78 includes a pair of apertures 102 and a pivot pin 104 (FIG. 6 only) that define an Axis $A_1$ that support the brake lever assembly 64 for pivotal movement relative to the brake lever support portion 78. The brake lever support portion 78 also includes a lip or ridge 106 that is shaped and dimensioned to conform to an edge of the cover portion 62, as described in greater detail below. The lip or ridge 106 extends around a portion of the bracket 60 from a point adjacent to the apertures 102 to an area between the radio unit receiving portion 76 and the brake lever support portion 78.

Figure 22:
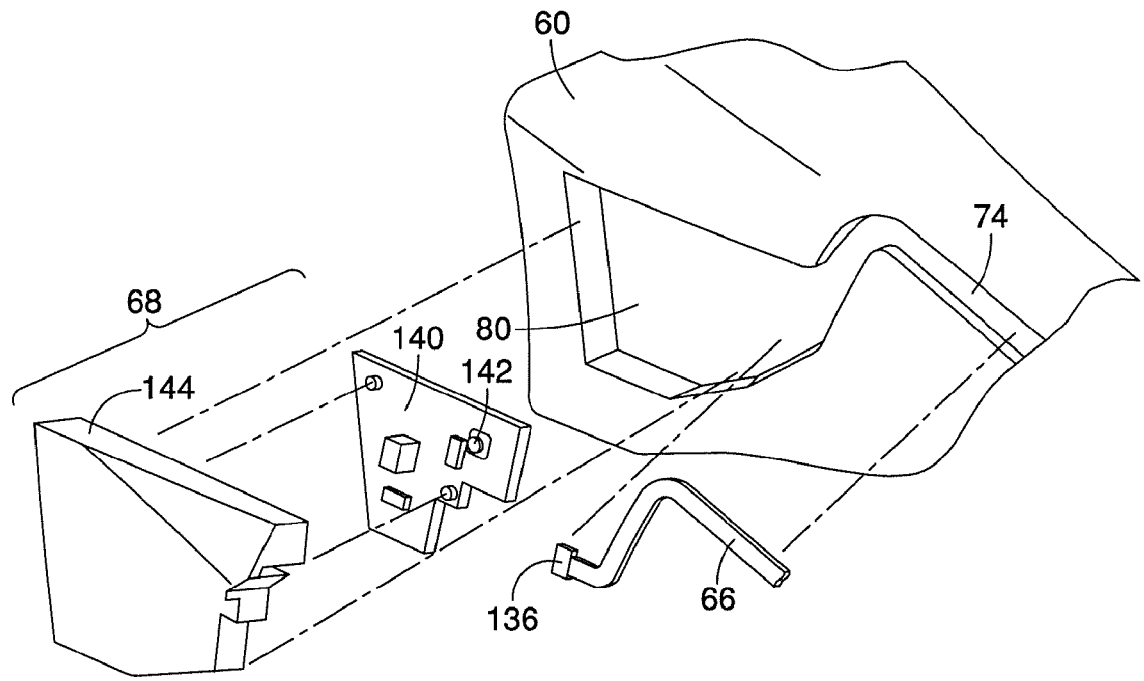
FIG. 22 is an exploded perspective view of a side surface of the bracket showing the antenna receiving portion, the antenna and a portion of the wiring assembly in accordance with the first embodiment of the present invention.

A description of the antenna receiving portion 80 of the bracket 60 is now provided with specific reference to FIGS. 8 and 22. The antenna receiving portion 80 is basically a recess formed in the surface of the bracket 60 extending away from the bicycle frame attachment portion 72 dimensioned to receive and obscure (conceal) the antenna 68. The antenna receiving portion 80 is open to the channel 74. As best shown in FIG. 8, the antenna receiving portion 80 is spaced apart from the radio unit receiving portion 76 with the channel 74 extending therebetween. The antenna receiving portion 80 is spaced apart from the brake lever support portion 78 but is closer to the brake lever support portion 78 than the radio unit receiving portion 76 of the bracket 60.

As best shown in FIG. 6, the cover 62 is a sleeve-like member that is preferably formed of a flexible polymer that snugly fits around the portions of the bracket 60. At a first end 108 of the cover 62, an opening is formed that is at least partially surrounded by a lip 110 that conforms to the shape of the lip or ridge 106 of the bracket lever support portion 78 of the bracket 60. The cover 62 also includes an embossed area 112 that aligns with the mode switching button 98 of the removable cover 96 of the radio unit receiving portion 76 of the bracket 60, thus forming part of the electronic switch 15, as described further below. A second end 114 of the cover 62 is shaped to conform to the bicycle frame attachment portion 72 of the bracket 60.

As best shown in FIG. 6, the brake lever assembly 64 is operably supported to the brake lever support portion 78 of the bracket 60 for pivoting movement about the Axis $A_1$. The brake lever assembly 64 is a conventional brake lever assembly. As shown in FIGS. 2, 4, 5 and 6, the brake lever assembly 64 basically includes a housing 120 (FIGS. 4-6 only), a conventional brake lever 122 and a shift lever 124.

The housing 120 includes conventional brake cable attachment hardware (not shown) that attaches to a conventional brake cable (not shown). The housing 120 also includes a pivot support portion 126 (FIG. 6 only) that is configured to connect to the bracket 60 via the pivot pin 104 in a conventional manner. When installed to the bracket 60, the brake lever 122 can pivot about the pivot pin 104 and the Axis $A_1$ and apply tension to a brake cable to operate one of the front brakes 24 and the rear brakes 26 in a conventional manner.

The housing 120 also includes support structure that allows the brake lever 122 to pivot about an Axis $A_2$, as indicated in FIGS. 2, 4, 5 and 6. The brake lever 122 includes support structure (not shown) that supports the shift lever 124 for pivotal movement about an axis $A_3$. The ability of the brake lever 122 about the Axis $A_2$ provides one action of the conventional mechanical shifting device to shift the chain C from a smaller chain sprocket to a larger chain sprocket of one of the cassette 28 or the chainring assembly 30. The ability of the shift lever 124 to move about the Axis $A_3$ provides a conventional mechanical means for moving the chain C from a larger chain sprocket to a smaller chain sprocket of one of the cassette 28 or the chainring assembly 30. Conventional shifting mechanism structures are well known, description herein will be omitted for the sake of brevity.

The brake lever 122 serves two functions. Specifically, the brake lever 122 serves as a brake lever to operate one of the front brakes 24 and the rear brakes 26 and also serves as a mechanical shifter. Movement about the Axis $A_1$ actuates the brakes. Movement about the Axis $A_2$ moves a Bowden-type cable (not shown) in order to move the chain C. The shift lever 124 also serves another portion of the mechanical shifter when pivoted about the Axis $A_3$. Consequently, the brake lever 122 and the shift lever 124 constitute a mechanical shifting device that is supported to the housing 120 of the brake lever assembly 64.

As best shown in FIG. 8, the wiring assembly 66 is dimensioned and configured to fit into the channel 74 and extend between the radio unit receiving portion 76 and the antenna receiving portion 80. The wiring assembly 66 includes a first connector 134 that is disposed within the radio unit receiving portion 76 of the bracket 60 (see FIGS. 11-15) and a second connector 136 configured to extend into the antenna receiving portion 80 (see FIG. 22).

Thus, the wiring assembly 66 is configured to electrically connect the antenna 68 to the removable radio communication unit 70.

As best shown in FIGS. 11-15, the first connector 134 is disposed within the radio unit receiving portion 76 of the bracket 60, and is held in position by the alignment posts 94 that extend upward from the bottom surface of blind bore 76a of the radio unit receiving portion 76. The alignment posts 95 extend through apertures in the first connector 134 but do not necessarily fix the first connector 134 in place. Rather, the alignment posts 94 are hot melted forming an enlarged head to fix the first connector 134 in position. Once the first connector 134 is positioned and fixed in place within the radio unit receiving portion 76, the rubber cover 92 is installed into the enlarged recess portion 74a of the channel 74, as indicated in FIGS. 13 and 15. Potting material P (FIG. 9) then fills in any voids around the rubber cover 92 and the enlarged recess portion 74a. As is described in greater detail below, the first connector 134 is configured to removably electrically connect to the removable radio communication unit 70.

Figure 23:
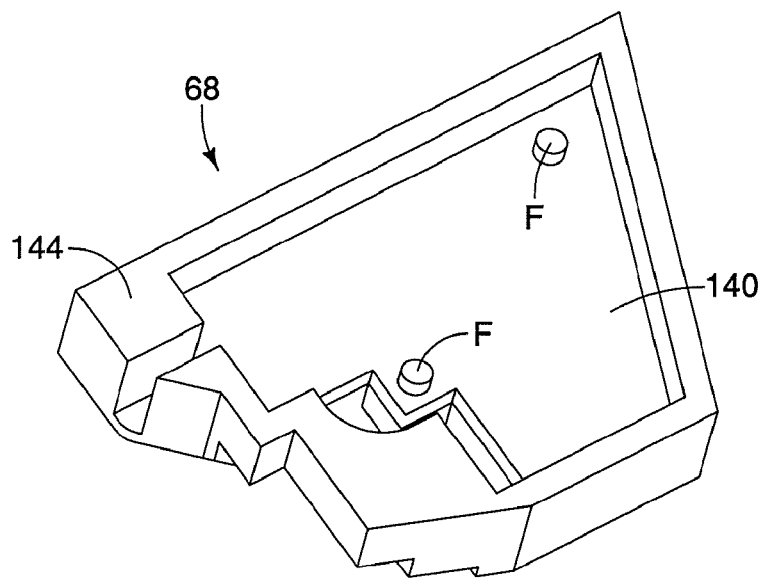
FIG. 23 is a perspective view of the antenna in accordance with the first embodiment of the present invention.

As best shown in FIGS. 8, 22 and 23, the antenna 68 supported to the bracket 60 such that the antenna is obscured within the recess that constitutes the antenna receiving portion 80. As best indicated in FIG. 3, the recess that constitutes the antenna receiving portion 80 and the antenna 68 are positioned on an inboard side of the bracket 60 such that the antenna 68 faces the radio signal receiver 52 (a radio signal receiving portion) of the controller/display unit 46 (the central processing unit) with controller/display unit 46 and the bracket 60 installed to the handlebar 18 of the frame 16 bicycle 10. Specifically, the antenna 68 is positioned on the inboard side of the bracket 60 such that the antenna 68 has a clear line-of-sight L to the radio signal receiver 52 of the controller/display unit 46, as indicated in FIG. 3.

The antenna 68 is preferably a planar patch antenna that includes radio broadcasting circuitry 140 with a connector portion 142 and a cover portion 144. With the antenna 68 installed in the antenna receiving portion 80, the connector portion 142 attaches to the second connector 136 of the wiring assembly 66. The antenna 68 is preferably fixed to the cover portion 144 via fasteners F, which can be conventional fasteners or can be posts extending from the cover portion 144 that are deformed to attach the antenna 68. The cover portion 144 is dimensioned to fit into the recess that constitutes the antenna receiving portion 80 of the bracket 60. The cover portion 144 can also be held in position to the antenna receiving portion 80 by hot welding, adhesives or similar retaining configurations. The cover portion 144 is made of a polymer material or other suitable material that permits free transmission of radio signals from the antenna 68 to permeate therethrough in order for transmitted radio signals to be received by the radio signal receiver 52 of the controller/display unit 46. The antenna 68 and cover portion 144 are fixed within the antenna receiving portion 80 by any of a variety of attachment means, such as an adhesive, potting material and/or fasteners (not shown).

A description of the removable radio communication unit 70 is now provided with specific reference to FIGS. 6 and 8-21. The removable radio communication unit 70 is configured to process switching signals produced by the electronic switch 15. The electronic switch 15 includes the embossed area 112 of the cover portion 62, the mode switching button 98 of the removable cover 96 of the radio unit receiving portion 76 and a mode switch 154, as described below. The removable radio communication unit 70 is further configured to broadcast corresponding radio signals via the antenna 68 to the controller/display unit 46, which in turn changes its mode of operation. The removable radio communication unit 70 is dimensioned such that it is removably disposed within the radio unit receiving portion 76 of the bracket 60.

As best shown in FIGS. 16-21, the removable radio communication unit 70 basically includes a hollow main body 150, alignment apertures 151 (FIGS. 16 and 17 only), a lid 152 with a mode switch 154, a lid electrode 156, a circuit panel 158 with battery electrodes 160, wiring 162, a connector 164 and a battery 166. The main body 150 is a cylindrically shaped member with a hollow interior.

The hollow interior of the main body 150 is preferably dimensioned to receive and support the circuit panel 158, the wiring 162 and the battery 166. The main body 150 and the lid 152 further comprise a battery retaining portion, such that the battery 166 fits within the main body 150 and can be covered and concealed within the main body 150 by the lid 152.

The main body 150 is preferably made of a plastic or polymer material. The circuit panel 158 (described below) is supported in a bottom region of the hollow main body 150 and includes the alignment apertures 151. The alignment apertures 151 are positioned and dimensioned to receive the alignment posts 95 of the radio unit receiving portion 76 of the bracket 60. Hence, the removable radio communication unit 70 can only be installed in the radio unit receiving portion 76 of the bracket 60 in specific orientation, as indicated in the drawings.

Figure 18:
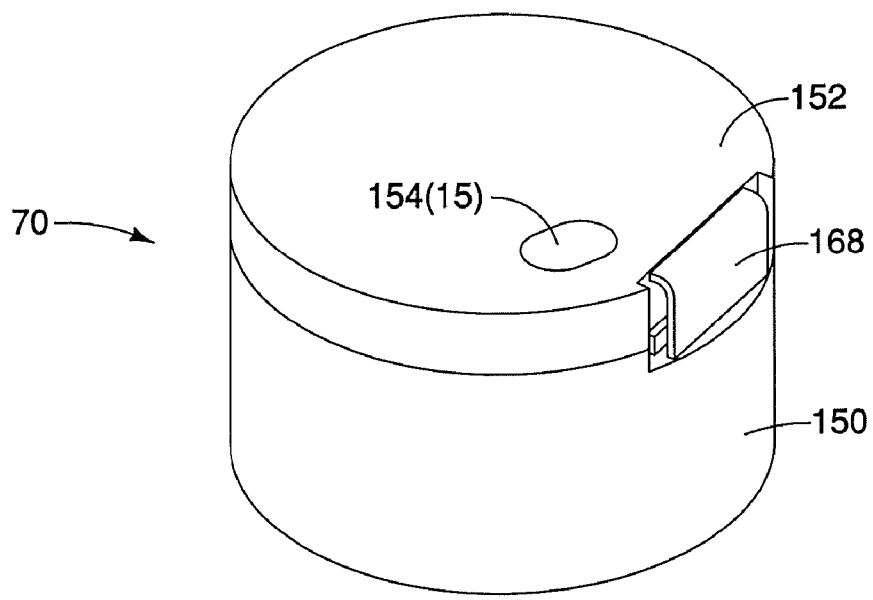
FIG. 18 is a perspective view of the removable radio communication unit shown removed from the radio unit receiving portion of the bracket of the wireless bicycle communication device with a cover of the removable radio communication unit in a closed position in accordance with the first embodiment of the present invention.
Figure 19:
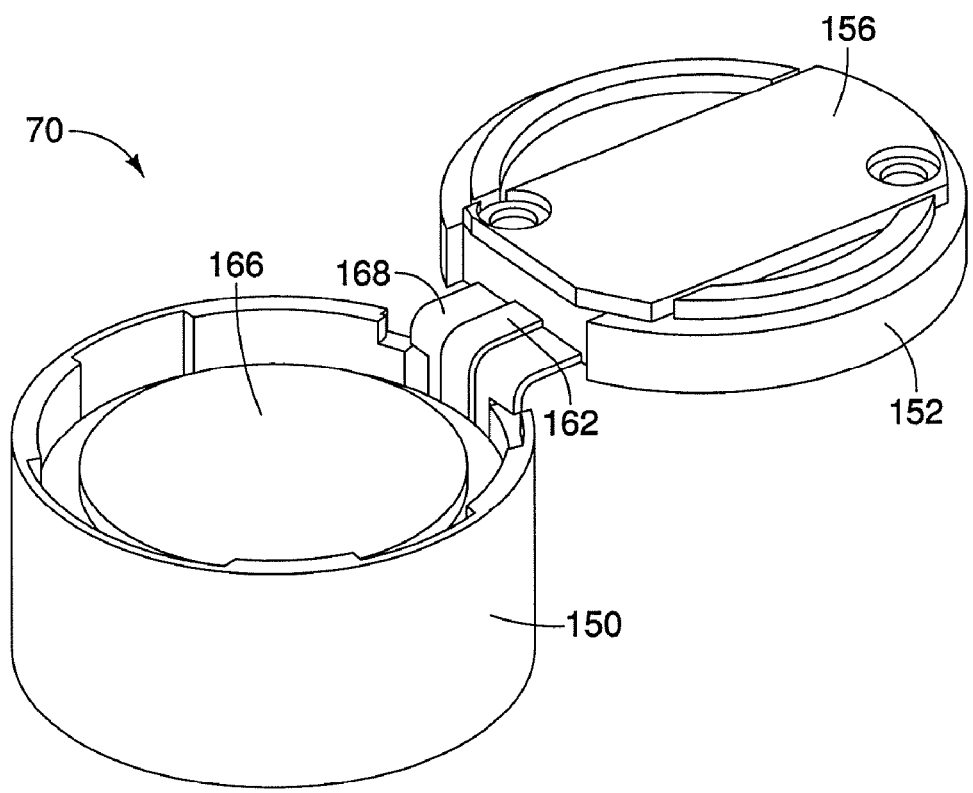
FIG. 19 is another perspective view of the removable radio communication unit similar to FIG. 18 but showing the cover of the removable radio communication unit in an open position revealing a battery and an upper battery electrode in accordance with the first embodiment of the present invention.

The lid 152 of the removable radio communication unit 70 is supported on the main body 150 by the hinge 168 (FIGS. 18 and 19 only). The hinge 168 can be a living hinge made of a pliable or flexible material, or can be a conventional metallic hinge with a pivot pin (not shown).

The lid 152 is configured to move via the hinge 168 between a closed position covering the hollow interior of the main body 150 (the battery retaining portion) and the battery 166, as shown in FIG. 18, and an open position exposing the hollow interior of the main body 150 (the battery retaining portion) and the battery 166, as shown in FIG. 19. The lid 152 includes the mode switch 154 and the lid electrode 156. The mode switch 154 is another portion of the electronic switch 15 that includes internal electrical contacts (not shown) configured to send a signal to the circuit panel 158 when the mode switch 154 is depressed. The mode switch 154 sends signals corresponding to a change in mode of operation of the controller/display unit 46.

The lid 152 is configured such that with the removable radio communication unit 70 installed in the proper orientation (with the alignment posts 95 extending into the alignment apertures 151) the mode switch 154 of the electronic switch 15 aligns with the mode switching button 98 of the removable cover 96 of the radio unit receiving portion 76 of the bracket 60. As shown in FIG. 17, the with the cover portion 62 installed on the bracket 60 and the removable cover 96, the embossed area 112 aligns with the switching button 98 of the removable cover 96 of the radio unit receiving portion 76 of the bracket 60. Hence, when a cyclist presses on the embossed area 112 of the cover portion 62, the pressing force causes the switching button 98 of the removable cover 96 of the radio unit receiving portion 76 of the bracket 60 to move, which in turn presses on the mode switch 154 of the removable radio communication unit 70. The mode switch 154 then sends a signal to the circuit panel 158. The circuit panel 158 is configured and programmed to transmit a corresponding signal to the controller/display unit 46 via the antenna 68. Consequently, the electronic switch 15 basically includes the mode switching button 98, the embossed area 112 and the mode switch 154. The mode switch 154 is operated by pressing the embossed area 112, which in turn presses against the mode switching button 98.

Figure 20:
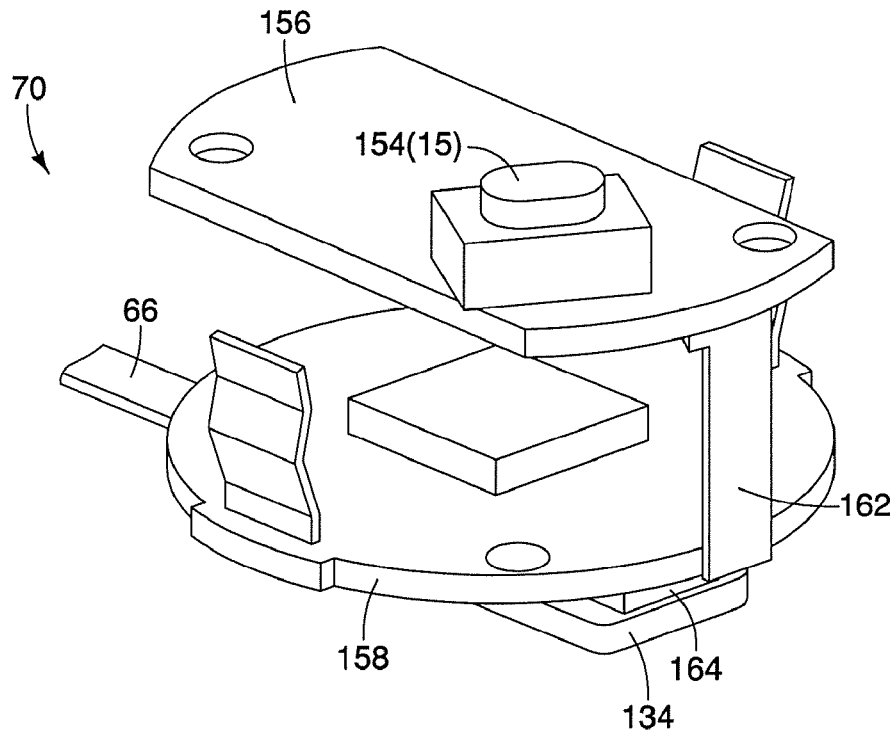
FIG. 20 is another perspective view of the removable radio communication unit similar to FIG. 18 with the cover, the battery and an outer shell of the removable radio communication unit removed to reveal the upper battery electrode, a mode switch assembly mounted to the upper battery electrode, a lower battery electrode, radio transmission circuitry and a portion of the wiring assembly in accordance with the first embodiment of the present invention.
Figure 21:
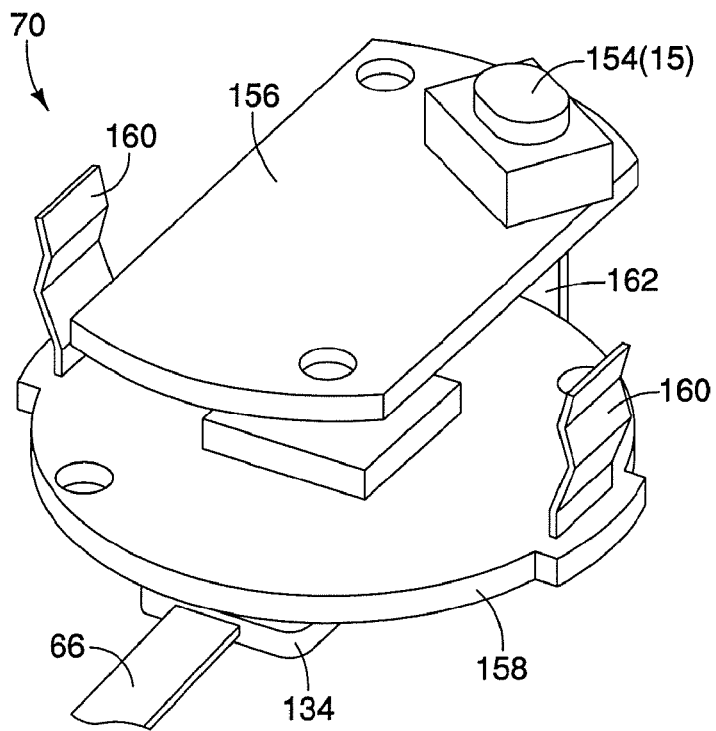
FIG. 21 is another perspective view of the removable radio communication unit from a reverse angle from FIG. 20 with the cover, the battery and an outer shell of the removable radio communication unit removed to reveal further details of the upper battery electrode, the mode switch assembly, the lower battery electrode, the radio transmission circuitry and the portion of the wiring assembly in accordance with the first embodiment of the present invention.

The lid electrode 156 is supported on the lid 152 by fasteners or support posts on an inner side of the lid 152. The lid electrode 156 supports the mode switch 154, as indicated in FIGS. 20 and 21. The lid electrode 156 is configured to contact an upper surface of the battery 166 to complete an electrical circuit with the battery 166.

As best shown in FIGS. 20 and 21 with the main body 150, lid 152 and the battery 166 removed, the lid electrode 156, the circuit panel 158, the battery electrodes 160 and the wiring 162 are more clearly shown. The wiring 162 extends from the mode switch 154 and the lid electrode 156 downward to the circuit panel 158. The circuit panel 158 includes the battery electrodes 160 and the connector 164. The battery electrodes 160 extend upward from the circuit panel 158 such that the battery electrodes 160 contact opposite sides of the battery 166. The battery electrodes 160 and the lid electrode 156 provide positive and negative electrode contacts such that the battery 166 supplies power to the circuit panel 158, brake lever assembly 64 and the antenna 68.

Figure 16:
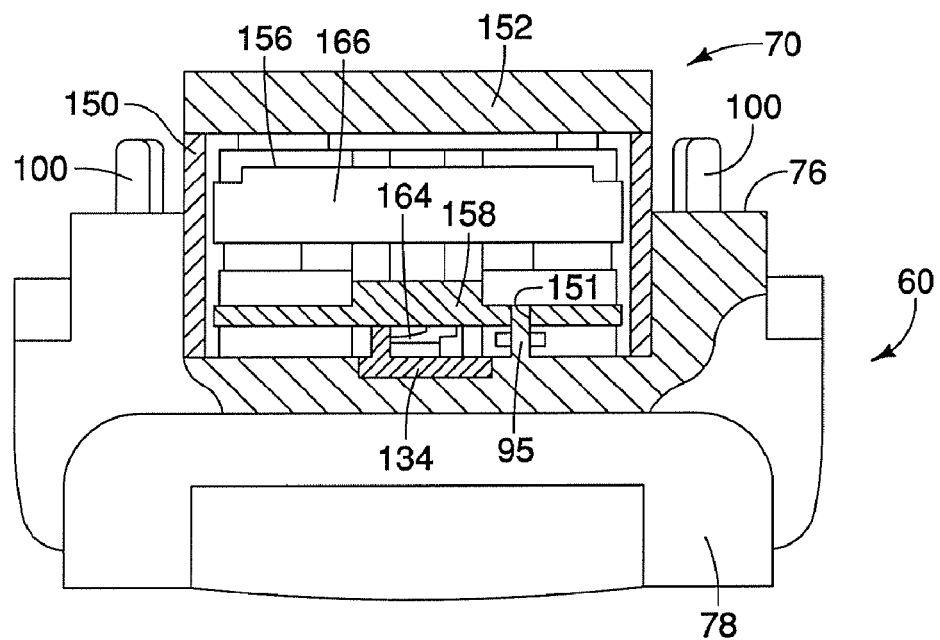
FIG. 16 is a side cross-sectional view of the radio unit receiving portion of the bracket of the wireless bicycle communication device, taken along the lines 16-16 in FIG. 11, showing details of the removable radio communication unit in accordance with the first embodiment of the present invention.

As best shown in FIGS. 16 and 17, the connector 164 is supported on a lower surface of the circuit panel 158. The connector 164 is oriented on the circuit panel 158 in alignment with the alignment apertures 151 such that the connector 164 further aligns with the first connector 134 of the wiring assembly 66 disposed within the radio unit receiving portion 76. The connector 164 and the first connector 134 are configured to be easily connected and disconnected from one another. Consequently, with the removable radio communication unit 70 having the connector 164 configured to detachably mate with the first connector 134, the removable radio communication unit 70 can easily be removed and re-installed into the radio unit receiving portion 76.

The circuit panel 158 is electrically connected the antenna 68 via the wiring assembly 66. Specifically, the first connector 134 is connected to the connector 164 of the circuit panel 158 of the removable radio communication unit 70. The second connector 136 of the wiring assembly 66 is further connected to the connector portion 142 of the antenna 68. Consequently, the circuit panel 158 is electrically connected to the antenna 68.

The circuit panel 158 includes circuitry and/or a microprocessor configured and/or programmed to process switching signals (mode switching signals) produced by the mode switch 154 of the electronic switch 15. Those signals are processed by the circuit panel 158 and changed into radio signals transmitted by the antenna 68 to the controller/display unit 46.

Hence, the radio communication unit 70 disposed within the radio unit receiving portion 76 of the bracket 60 is configured to process chain derailleur movement signals and broadcast corresponding radio signals via the antenna 68 to the radio signal receiver 52 (radio signal receiving portion) of the controller/display unit 46 (the central processing unit). The controller/display unit 46 (the central processing unit) is further configured to control movement of the front derailleur 42 and the rear derailleur 44 in response to receiving the radio signals from the antenna 68.

As described above and shown in FIG. 8, the radio communication unit 70 and the antenna 68 are spaced apart from one another. Further, the removable radio communication unit 70 is easily removable from the radio unit receiving portion 76 of the bracket 60. For example, to access and remove the removable radio communication unit 70, the cover 62 is peeled back or removed from the bracket 60. Next, the removable cover 96 is removed from the bracket 60 exposing the removable radio communication unit 70. The removable radio communication unit 70 can then be removed from the blind bore 76a of the radio unit receiving portion 76. Installation includes reverse order of the steps described above.

The battery 166 is exposed by opening the lid 152. Hence, the battery 166 is easily replaced. Further, the removable radio communication unit 70 can also be installed to a battery recharging device (not shown) that re-charges the battery 166 when necessary. In other words, one feature of the radio communication unit 70 is that it can be installed into a battery recharging device, in the instance where the battery 166 is a rechargeable battery.

Second Embodiment

Figure 24:
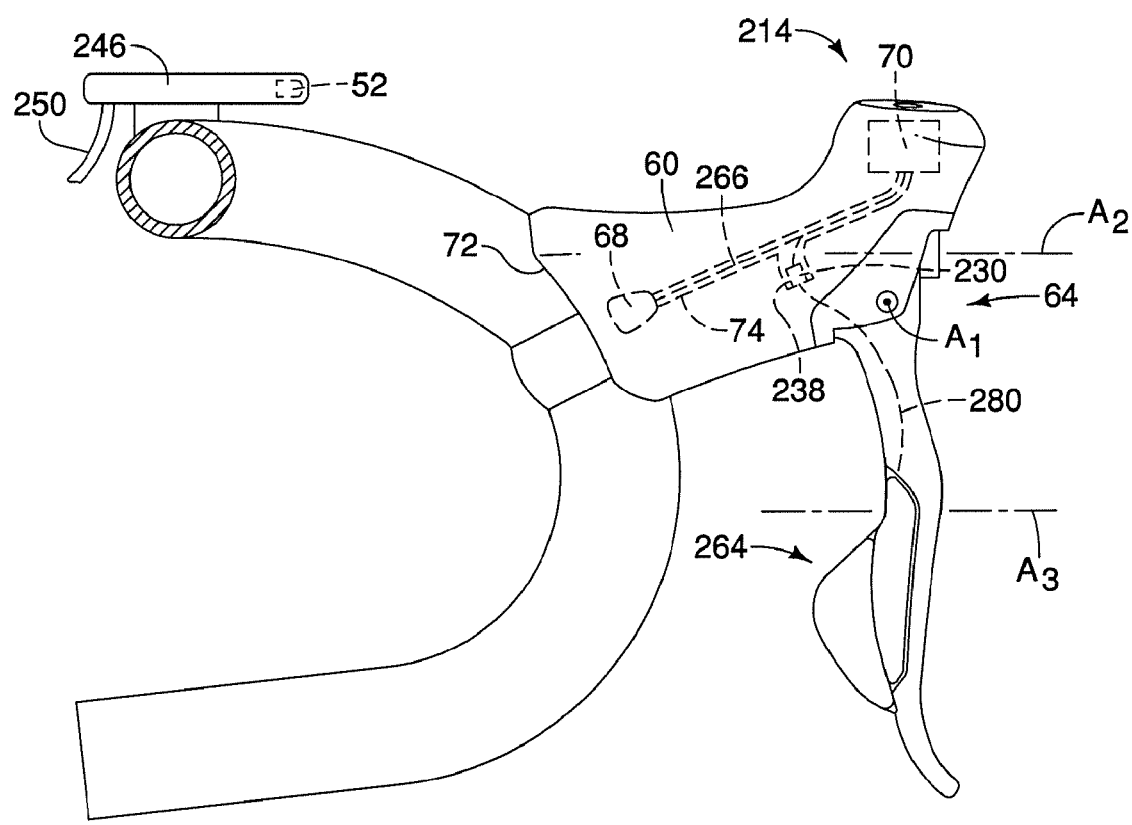
FIG. 24 is a side view of a portion of the handlebar showing an inboard side of a wireless bicycle communication device in accordance with a second embodiment of the present invention.
Figure 25:
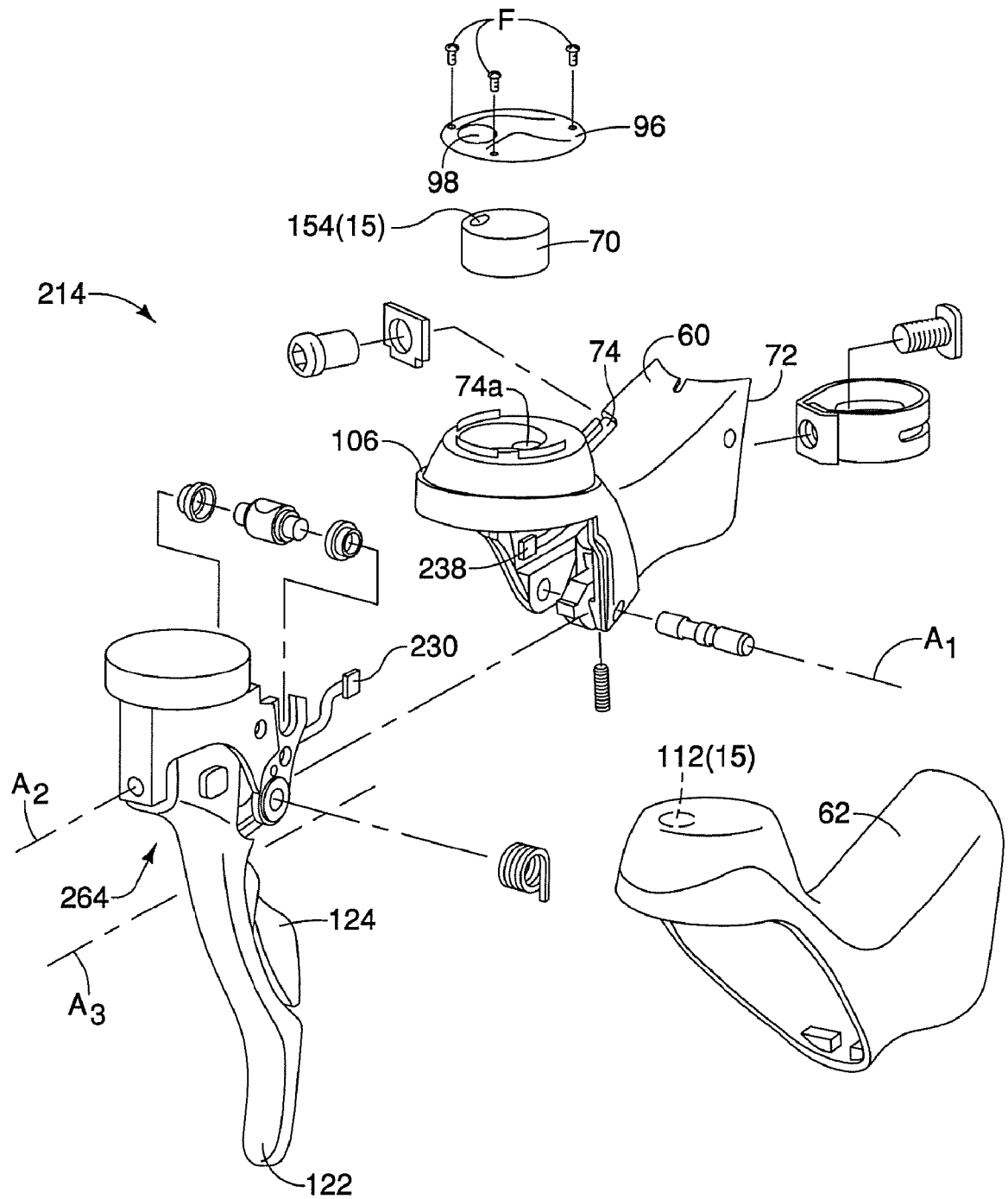
FIG. 25 is an exploded view of one of the wireless bicycle communication devices shown removed from the bicycle, showing the bracket, the cover portion and the brake lever assembly in accordance with the second embodiment the present invention.
Figure 26:
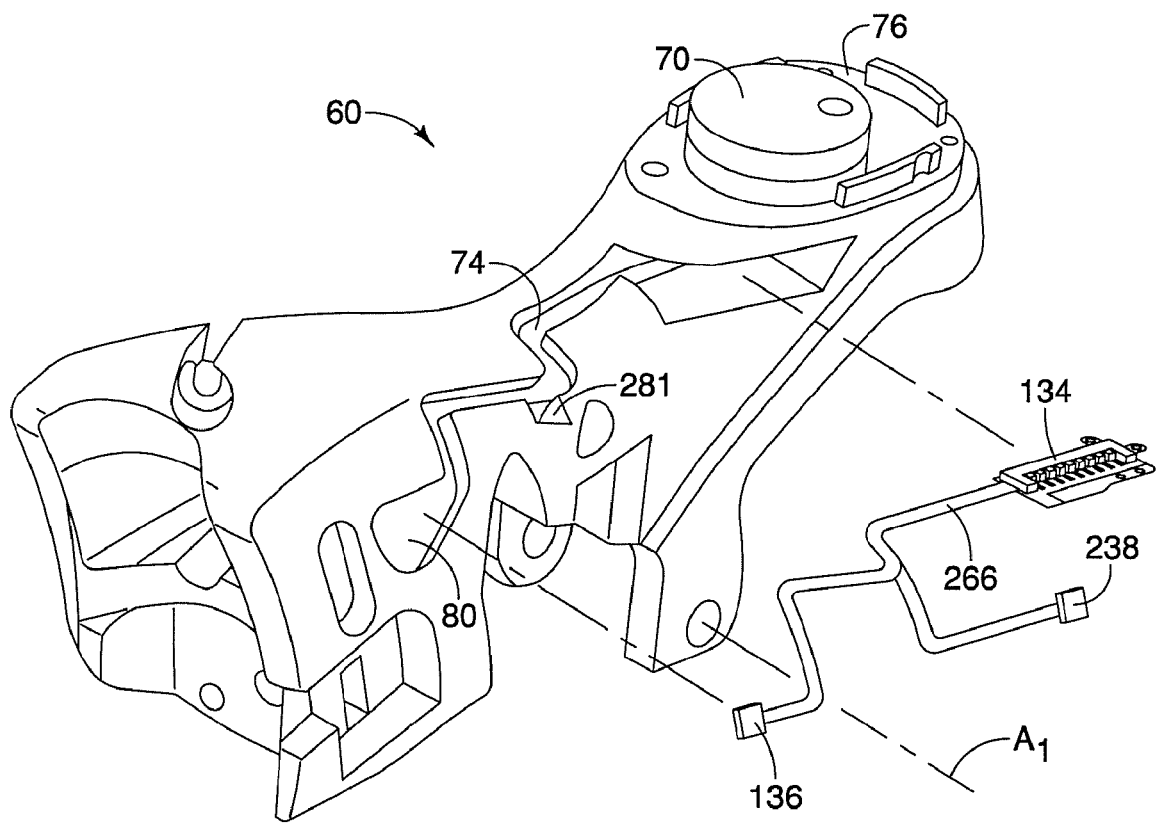
FIG. 26 is a perspective exploded view of the bracket of the wireless bicycle communication device and a corresponding wiring assembly with other portions of the wireless bicycle communication device removed to reveal a channel that receives a portion of the wiring assembly, a brake lever support portion, a radio unit receiving portion and an antenna receiving portion in accordance with the second embodiment of the present invention.

Referring now to FIG. 24-26, a wireless communication device 214 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the wireless communication device 214 includes all the features of the wireless communication device 214, except the brake lever assembly 64 with its mechanical shifting device. Instead, the brake lever assembly 64 has been replaced with a brake lever assembly 264 that includes a conventional electric shifting mechanism such as that disclosed and described in co-pending US Patent Publication Number 2007/0137361 (Ser. No. 11/281,892) assigned to Shimano Inc.

In the second embodiment, a controller/display unit 246 processes wireless signals from the electronic switch 15. The controller/display unit 246 includes all of the modes of operation of the controller/display unit 46 of the first embodiment, but also includes additional features programmed into it. Otherwise the controller/display unit 246 is the same as the above described controller/display unit 46 of the first embodiment and, for instance, includes the radio signal receiver 52. However, in the second embodiment the controller/display unit 246 is additionally configured to receive shifting signals corresponding to control of shifting operations of a conventional electrically powered front derailleur (not shown) and a conventional electrically powered rear derailleur (not shown). Specifically, the electrically powered front derailleur and the electrically powered rear derailleur can be controlled based upon shifting signals transmitted from the wireless communication device 214.

The controller/display unit 246 can be configured to receive signals from the wireless communication device 214 and send corresponding positioning signals via a connector cable 250 to both the electrically powered front derailleur and the electrically powered rear derailleur in response to the signals received from the wireless communication device 214. Further, the controller/display unit 246 can also be configured to receive and process current derailleur position signals from both the electrically powered front derailleur and the electrically powered rear derailleur and displaying the current gear ratio of the electrically powered front derailleur and the electrically powered rear derailleur.

A description of the wireless communication device 214 is now provided. In the second embodiment, the wireless communication device 214 includes features of the wireless communication device 14 of the first embodiment, including the bracket 60, the cover portion 62, the brake lever assembly 64, the antenna 68 and the removable radio communication unit 70. However, the wiring assembly 66 of the first embodiment is replaced with a wiring harness 266.

The bracket 60 includes the bicycle frame attachment portion 72, the channel 74, the radio unit receiving portion 76, the brake lever support portion 78 and the antenna receiving portion 80, as described above in the first embodiment. However, the bracket 60 additionally includes an aperture 281 open to the channel 74. Specifically, the aperture 281 is located between the radio unit receiving portion 76 and the antenna receiving portion 80, as best shown in FIG. 26.

The wiring harness 266 includes first connector 134, the second connector 136 but additionally includes a third connector 238, as shown in FIGS. 24-26. The aperture 281 is dimensioned and positioned to allow the third connector 238 to extend from the channel 74 to a connector 230 connected to a wiring harness 280 extending from the brake lever assembly 264, as indicated in FIG. 24. More specifically, as shown in FIG. 26, the housing 120 of the brake lever assembly 264 includes the wiring connector 230 configured to connect to the wiring assembly 266 such that the generated chain derailleur movement signals are transmitted through the wiring assembly 266 to the removable radio communication unit 70 and the antenna 68. Consequently, the antenna 68 transmits switching signals from the electric switch 15 and derailleur position changing or shifting signals from the shifting mechanism of the conventional electric shifting mechanism of the brake lever assembly 264.

Thus, the wiring assembly 266 of the second embodiment is configured to electrically connect the electronic shifting mechanism of the brake lever assembly 264, the antenna 68 and the removable radio communication unit 70.

The removable radio communication unit 70 includes all of the functionality and structure described above in the first embodiment but additionally is configured to process signals produced by shifting movements of the brake lever 122 and shifter lever 124 about the Axis $A_2$ and $A_3$. The removable radio communication unit 70 is further configured to broadcast corresponding radio signals via the antenna 68 to the controller/display unit 246, which in turn takes appropriate positioning control of the electrically powered front derailleur and the electrically powered rear derailleur.

Hence, the radio communication unit 70 disposed within the radio unit receiving portion 76 of the bracket 60 is configured to process mode switching signals from the electronic switch 15 and chain derailleur movement signals from the electronic brake lever assembly 264 and broadcast corresponding radio signals via the antenna 68 to the radio signal receiver 52 (radio signal receiving portion) of the controller/display unit 246 (the central processing unit). The controller/display unit 246 (the central processing unit) is further configured to control movement of the electrically powered front derailleur and the electrically powered rear derailleur in response to receiving the radio signals from the antenna 68.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A wireless bicycle communication device comprising:
a bracket having a bicycle frame attachment portion, a radio unit receiving portion located at an upper portion of the bracket spaced apart from the bicycle frame attachment portion and an antenna receiving portion disposed at an inboard side of the bracket between the bicycle frame attachment portion and the radio unit receiving portion;
an electronic switch coupled to the bracket configured to generate switching signals;
an antenna supported to the antenna receiving portion;
a wiring assembly including a first connector disposed within the radio unit receiving portion of the bracket, the wiring assembly electrically connecting the antenna and the first connector;
a radio communication unit disposed within the radio unit receiving portion having a second connector configured to detachably mate with the first connector, the radio communication unit being configured to process switching signals from the electronic switch and broadcast corresponding radio signals via the antenna.

2. The wireless bicycle communication device according to claim 1, wherein
the bracket includes a brake lever support portion and a brake lever operably supported to the brake lever support portion.

3. The wireless bicycle communication device according to claim 2, wherein
the antenna receiving portion is spaced apart from the brake lever support portion.

4. The wireless bicycle communication device according to claim 2, wherein
the electronic switch is an electronic shifting device supported to the brake lever and the switching signals include derailleur shifting signals.

5. The wireless bicycle communication device according to claim 4, wherein
the radio communication unit is configured to process the derailleur shifting signals from the electronic shifting device and broadcast corresponding radio signals via the antenna.

6. The wireless bicycle communication device according to claim 1, wherein
the antenna receiving portion is spaced apart from the bicycle frame attachment portion.

7. The wireless bicycle communication device according to claim 1, wherein
the antenna receiving portion includes a recess formed in the bracket dimensioned to receive and obscure the antenna.

8. The wireless bicycle communication device according to claim 7, wherein the recess is located on an inboard surface of the bracket extending away from the bicycle frame attachment portion.

9. The wireless bicycle communication device according to claim 7, wherein
the bracket includes a channel that extends between the recess and the radio unit receiving portion with the wiring assembly disposed within the channel.

10. The wireless bicycle communication device according to claim 1, wherein
the bracket includes a channel that extends between the antenna receiving portion and the radio unit receiving portion with the wiring assembly disposed within the channel.

11. The wireless bicycle communication device according to claim 1, wherein
the antenna is a planar patch antenna.

12. The wireless bicycle communication device according to claim 1, wherein
the radio unit receiving portion includes a trough dimensioned to receive and at least partially conceal the radio communication unit.

13. The wireless bicycle communication device according to claim 1, wherein
the radio communication unit is removable from the bracket and re-installable to the bracket.

14. A wireless bicycle communication device comprising:
a central processing unit having a radio signal receiving portion and a bicycle frame attachment portion;
a bracket having a bicycle frame attachment portion, a radio unit receiving portion and a recess on an inboard side of the bracket;
an antenna supported to the bracket such that the antenna is obscured within the recess, with the recess and antenna being positioned such that the antenna faces the radio signal receiving portion of the central processing unit with the central processing unit and the bracket installed to a bicycle frame;
an electronic switch coupled to the bracket configured to generate switching signals; and
a radio communication unit disposed within the radio unit receiving portion configured to process the switching signals and broadcast corresponding radio signals via the antenna to the radio signal receiving portion of the central processing unit.

15. The wireless bicycle communication device according to claim 14, wherein
the radio communication unit and the recess are spaced apart from one another.

16. The wireless bicycle communication device according to claim 14, wherein
the radio communication unit is removable from the radio unit receiving portion.

17. The wireless bicycle communication device according to claim 16, wherein
the radio unit receiving portion includes a trough dimensioned to receive the radio communication unit,
the bracket includes a wiring assembly connected at a first end to the antenna and a second end with a first connector disposed within the trough, and
the radio communication unit includes a second connector dimensioned to releasably couple with the first connector.

18. The wireless bicycle communication device according to claim 14, wherein
the bracket includes a brake lever support portion having a brake lever supported to the brake lever support portion with an electronic shifting device being supported to the brake lever.

19. The wireless bicycle communication device according to claim 18, wherein
the electronic shifting device is configured to generate derailleur shifting signals and the radio communication unit is configured to process the derailleur shifting signals and broadcast corresponding radio signals via the antenna to the radio signal receiving portion of the central processing unit.

* * * * *